United States Patent
Liao

(10) Patent No.: US 10,122,233 B2
(45) Date of Patent: Nov. 6, 2018

(54) MULTI-SERIES CONNECTION COIL WITHOUT FRAMEWORK

(71) Applicant: Dongguan Li Yin Technology Limited, Dongguan, Guangdong (CN)

(72) Inventor: Huangtung Liao, Guangdong (CN)

(73) Assignee: Dongguan Li Yin Technology Limited, Dongguan (CN)

( * ) Notice: Subject to any disclaimer, the term of this patent is extended or adjusted under 35 U.S.C. 154(b) by 0 days.

(21) Appl. No.: 15/588,680

(22) Filed: May 7, 2017

(65) Prior Publication Data

US 2017/0366058 A1    Dec. 21, 2017

Related U.S. Application Data

(63) Continuation of application No. PCT/CN2017/080904, filed on Apr. 18, 2017.

(30) Foreign Application Priority Data

Jun. 21, 2016 (CN) ............... 2016 1 0445299

(51) Int. Cl.
*H02K 3/28* (2006.01)
*H02K 41/035* (2006.01)
*H02K 3/04* (2006.01)

(52) U.S. Cl.
CPC ............ *H02K 3/28* (2013.01); *H02K 3/04* (2013.01); *H02K 41/0356* (2013.01)

(58) Field of Classification Search
CPC . H02K 3/28; H02K 41/02; H01F 5/00; H04N 5/2251
USPC ..................................... 310/12.22
See application file for complete search history.

(56) References Cited

U.S. PATENT DOCUMENTS

| | | | | |
|---|---|---|---|---|
| 4,496,287 A | * | 1/1985 | Nelson | F04B 17/046 417/417 |
| 2002/0063492 A1 | * | 5/2002 | Scott | H02K 1/02 310/261.1 |
| 2013/0134809 A1 | * | 5/2013 | Phillips | H02K 3/30 310/71 |
| 2016/0127833 A1 | * | 5/2016 | Yasuda | H04R 29/003 381/59 |

FOREIGN PATENT DOCUMENTS

CN    202004955 U  * 10/2011
CN    203279148 U  * 11/2013

OTHER PUBLICATIONS

Translation of foreign document CN 202004955 U (Year: 2011).*
Translation of foreign document CN 203279148 U (Year: 2013).*

* cited by examiner

Primary Examiner — Alex W Mok

(57) ABSTRACT

The present invention discloses a multi-series connection coil without a framework, including at least two potted coils, where the multi-series connection coil without a framework is formed by winding in the following steps: step 1, first winding an enameled wire to form a first potted coil; step 2, on the basis of the first potted coil, continuing to wind a second potted coil; and step 3, continuing to wind potted coils according to requirements. The present invention is applied to a mobile phone camera, a laser head, a motor, a driver, or a smart wearable device, such as a pedometer and a VR device, and can generate a greater driving force in a case of electric power input at a low voltage, and the coil has higher sensitivity.

5 Claims, 4 Drawing Sheets

MULTI-SERIES CONNECTION COIL WITHOUT FRAMEWORK

CROSS REFERENCE TO RELATED APPLICATIONS

The present application is a Continuation Application of PCT application No. PCT/CN2017/080904 filed on Apr. 18, 2017, which claims the benefit of Chinese Patent Application No. 201610445299.0 filed on Jun. 21, 2016. All the above are hereby incorporated by reference.

BACKGROUND

Technical Field

The present invention relates to the technical field of small electronic accessories, and in particular, to a multi-series connection coil without a framework that is used in a mobile phone camera, a laser head, a motor, a driver, or a smart wearable device.

Related Art

Currently, coils are used in mobile phone cameras, laser heads, motors, drivers, and smart wearable devices. In a laser head, a lens is adhered to a movable coil, and the movable coil cooperates with a magnet. When being electrified, the coil can drive the lens to move up and down, so as to focusing laser emitted by a laser diode.

In a mobile phone camera, a camera is fixed on a movable coil, and the movable coil cooperates with a magnet. When being electrified, the coil can drive the lens to move up and down, so as to implement imaging and focusing functions during photographing of the mobile phone.

In the prior art, a coil drive apparatus usually has only one magnetic circuit system. If coil installation space (mainly a height) is limited, to improve sensitivity of a drive coil, the only approach is to increase magnetic flux density of a magnet. There are two approaches for increasing magnetic flux density. One is using a magnet with a stronger magnetic property, and the other one is using a magnet with a larger volume. However, improvement of the magnetic flux density is restricted by a magnetic material, and sensitivity of the drive coil cannot be substantially improved.

SUMMARY

An objective of the present invention is to provide a multi-series connection coil without a framework, so as to overcome existing disadvantages, generate a greater driving force at a low voltage, and effectively improve sensitivity of a drive coil.

To achieve the aforementioned objective, solutions of the present invention are:

A multi-series connection coil without a framework includes at least two potted coils, where each of the potted coils is provided with an input end and an output end, the input ends and the output ends of the potted coils are connected in series in sequence, and the multi-series connection coil without a framework is formed by winding in the following steps:

Step 1, first winding an enameled wire to form a first potted coil;

Step 2, on the basis that winding of the first potted coil is completed, continuing to wind a second potted coil, where an input end of the second potted coil is connected in series to an output end of the first potted coil; and Step 3, continuing to wind potted coils according to requirements, where input ends and output ends of the potted coils are connected in series in sequence.

Preferably, when the potted coils are wound, the first potted coil with multiple inner and outer layers is first wound by using an enameled wire, and then on the basis that winding of the first potted coil with multiple inner and outer layers is completed, a second potted coil with multiple inner and outer layers continues to be wound.

Preferably, the coil can be wound to form a circular ring-shaped coil, an elliptical coil, a rectangular coil, a square coil, a racetrack-shaped coil, a square coil, a regular hexagon-shaped coil, or a regular octagon-shaped coil according to a requirement.

By means of the foregoing technical solutions, because the potted coils are independent of each other, but are connected to each other in series, when the potted coils are placed, not only limitation of coil installation space, in particular, limitation of a height, can be overcome, in which each potted coil may be flexibly horizontally placed, to overcome limitation of the coil installation space to height space, but also multiple coils are provided to increase magnetic flux density. Therefore, when the coil is applied to a mobile phone camera, a laser head, a motor, a driver, or a smart wearable device, the coil can generate a greater driving force in a case of electric energy input at a low voltage, and sensitivity of a drive coil is higher in actual application.

DETAILED DESCRIPTION

To make an objective, technical solutions, and advantages of the present invention clearer, the present invention is further described below in detail with reference to the accompanying drawings and embodiments. It should be understood that specific embodiments described herein are only used to explain the present invention rather than limit the present invention.

Embodiment 1

Figure 1:
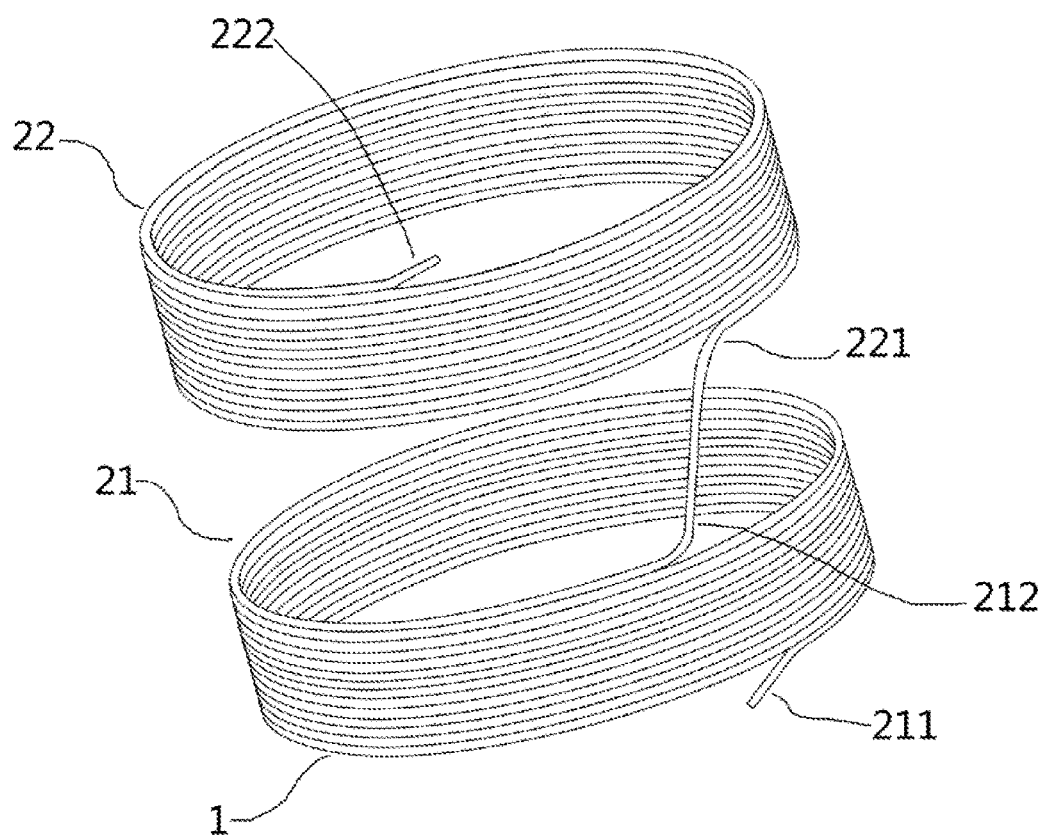
FIG. 1 is a three-dimensional schematic diagram of Embodiment 1 of the present invention.
Figure 2:
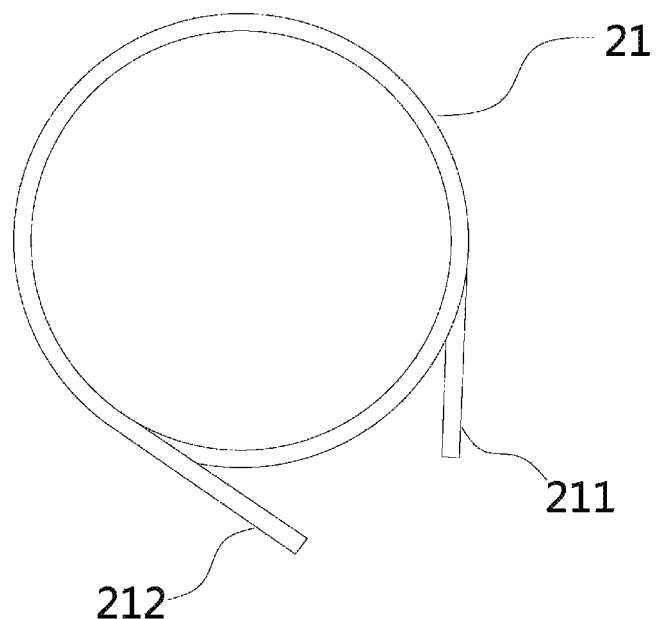
FIG. 2 is a top view of Embodiment 1 of the present invention.

Referring to FIG. 1 and FIG. 2, the present invention discloses a multi-series connection coil without a framework, including two potted coils 21 and 22. The potted coils 21 and 22 are respectively provided with input ends 211 and 221 and output ends 212 and 222. The input end 211 of the potted coil 22 is connected in series to the output end 212 of the potted coil 21. The multi-series connection coil without a framework in this embodiment is formed by winding in the following steps:

Step 1: First wind an enameled wire 1 to form a first potted coil 21, where the potted coil is a single-layer coil.

Step 2: On the basis of the first potted coil 21, continue to wind a second potted coil 22, where during winding, the input end 221 of the second potted coil 22 is connected in series to the output end 212 of the first potted coil 21, that is, the two potted coils 21 and 22 are completed by winding the same enameled wire 1.

During specific use, in the multi-series connection coil without a framework, according to installation environments and location space of different electronic devices in which the coil is used, shapes of the potted coils may also be greatly different from each other. To improve a utilization rate of space within an electronic product, the potted coil may be designed into different shapes, such as a circular shape, an elliptical shape, a rectangular shape, or a racetrack shape, according to a requirement. A circular ring-shaped coil, an elliptical coil, or a rectangular coil is used by matching smart wearable devices of different shapes, and has a simple structure and wide applicability.

Certainly, when being specifically used in an electronic device, the multi-series connection coil without a framework may be designed into a square shape, a regular hexagonal shape, or a regular octagonal shape according to preferences of different users and innovative ideas of manufacturers. A square coil, a regular hexagon-shaped coil, or a regular octagon-shaped coil is applied to a drive coil in the foregoing shape.

During specific use, when the multi-series connection coil without a framework is applied to an electronic device, because the potted coils are independent of each other, but are connected to each other in series, when the potted coils are placed, not only limitation of coil installation space can be overcome, and the potted coils can be flexibly placed, but also multiple coils are provided to increase magnetic flux density. Therefore, the coil can generate a greater driving force in a case of electric energy input at a low voltage, that is, sensitivity of a drive coil is higher in actual application Embodiment 2

Figure 3:
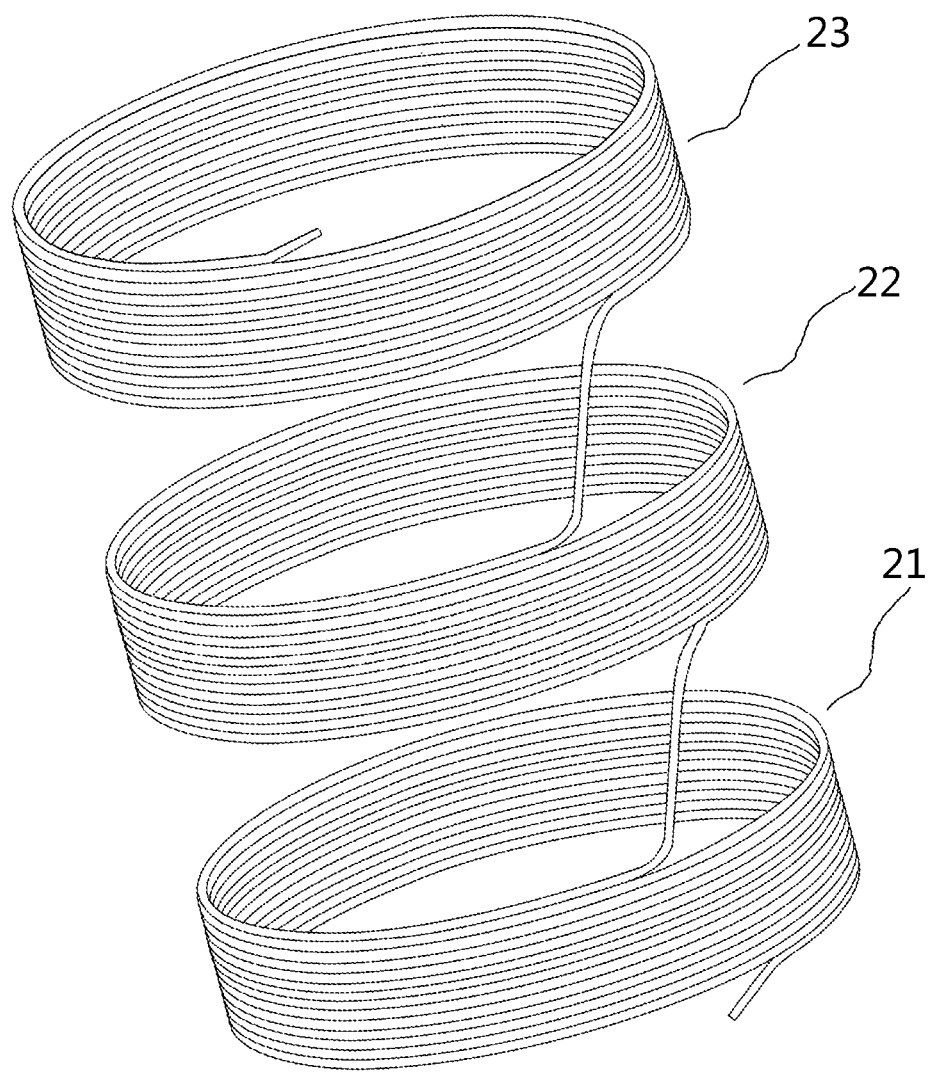
FIG. 3 is a three-dimensional schematic diagram of Embodiment 2 of the present invention.

Referring to FIG. 3, Embodiment 2 differs from Embodiment 1 in that in Embodiment 2, three potted coils 21, 22, and 23 are connected in series. According to a use scenario and design requirements of a drive coil, the drive coil is applicable to an electronic device with smaller installation space and a higher power requirement, and has relatively strong practicability.

In this embodiment, three potted coils are connected in series, and thus, a diameter may be smaller. Therefore, the drive coil is applicable to an electronic device with smaller installation space but a higher power requirement.

Embodiment 3

Figure 4:
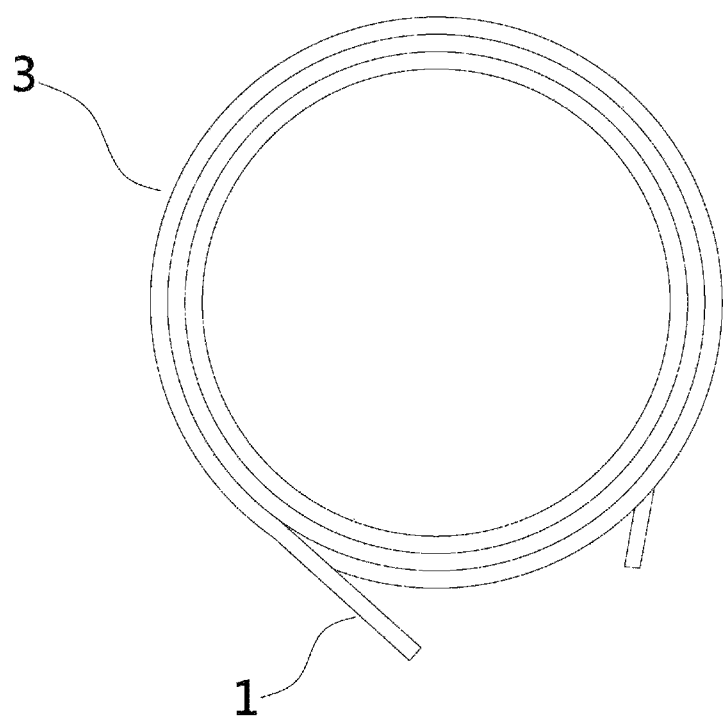
FIG. 4 is a schematic structural diagram of Embodiment 3 of the present invention.

Referring to FIG. 4, Embodiment 3 differs from Embodiment 1 in that: when the potted coils are wound, a first potted coil 3 with a structure of multiple inner and outer layers is wound by using an enameled wire 1. Then, on the basis that winding of the first potted coil with multiple inner and outer layers is completed, a second potted coil with multiple inner and outer layers continues to be wound.

In this embodiment, because the potted coil 3 is a potted coil with a structure of multiple inner and outer layers, the coil can generate greater kinetic energy during operation and has higher output power.

The foregoing descriptions are merely preferred specific implementation manners of the present invention, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure should be subject to the protection scope of the claims.

What is claimed is:

1. A multi-series connection coil without a framework, comprising at least two potted coils, wherein the multi-series connection coil is configured to be connected to an object and actuate the object to move, each of the potted coils is provided with an input end and an output end, the input ends and the output ends of the potted coils are connected in series in sequence, the multi-series connection coil, as a whole, has only one input end and one output end, and the multi-series connection coil without a framework is formed by winding in the following steps:
  step 1, first winding an enameled wire to form a first potted coil;
  step 2, on the basis that winding of the first potted coil is completed, continuing to wind a second potted coil, wherein an input end of the second potted coil is connected in series to an output end of the first potted coil; and
  step 3, continuing to wind potted coils according to requirements, wherein input ends and output ends of the potted coils are connected in series in sequence, and the potted coils are formed by winding one enameled wire.

2. The multi-series connection coil without a framework according to claim 1, wherein when the potted coils are wound, the first potted coil with multiple inner and outer layers is first wound by using an enameled wire, and then on the basis that winding of the first potted coil with multiple inner and outer layers is completed, a second potted coil with multiple inner and outer layers continues to be wound.

3. The multi-series connection coil without a framework according to claim 2, wherein the coil can be wound to form a circular ring-shaped coil, an elliptical coil, a rectangular coil, a square coil, a racetrack-shaped coil, a square coil, a regular hexagon-shaped coil, or a regular octagon-shaped coil according to a requirement.

4. The multi-series connection coil without a framework according to claim 1, wherein the coil can be wound to form a circular ring-shaped coil, an elliptical coil, a rectangular coil, a square coil, a racetrack-shaped coil, a square coil, a regular hexagon-shaped coil, or a regular octagon-shaped coil according to a requirement.

5. The multi-series connection coil without a framework according to claim 1, wherein the object comprises a lens and a camera.

* * * * *